Jan. 30, 1945.  C. A. HUBERT ET AL  2,368,139
GEAR SHIFTER LOCK
Filed Dec. 18, 1943  2 Sheets-Sheet 1
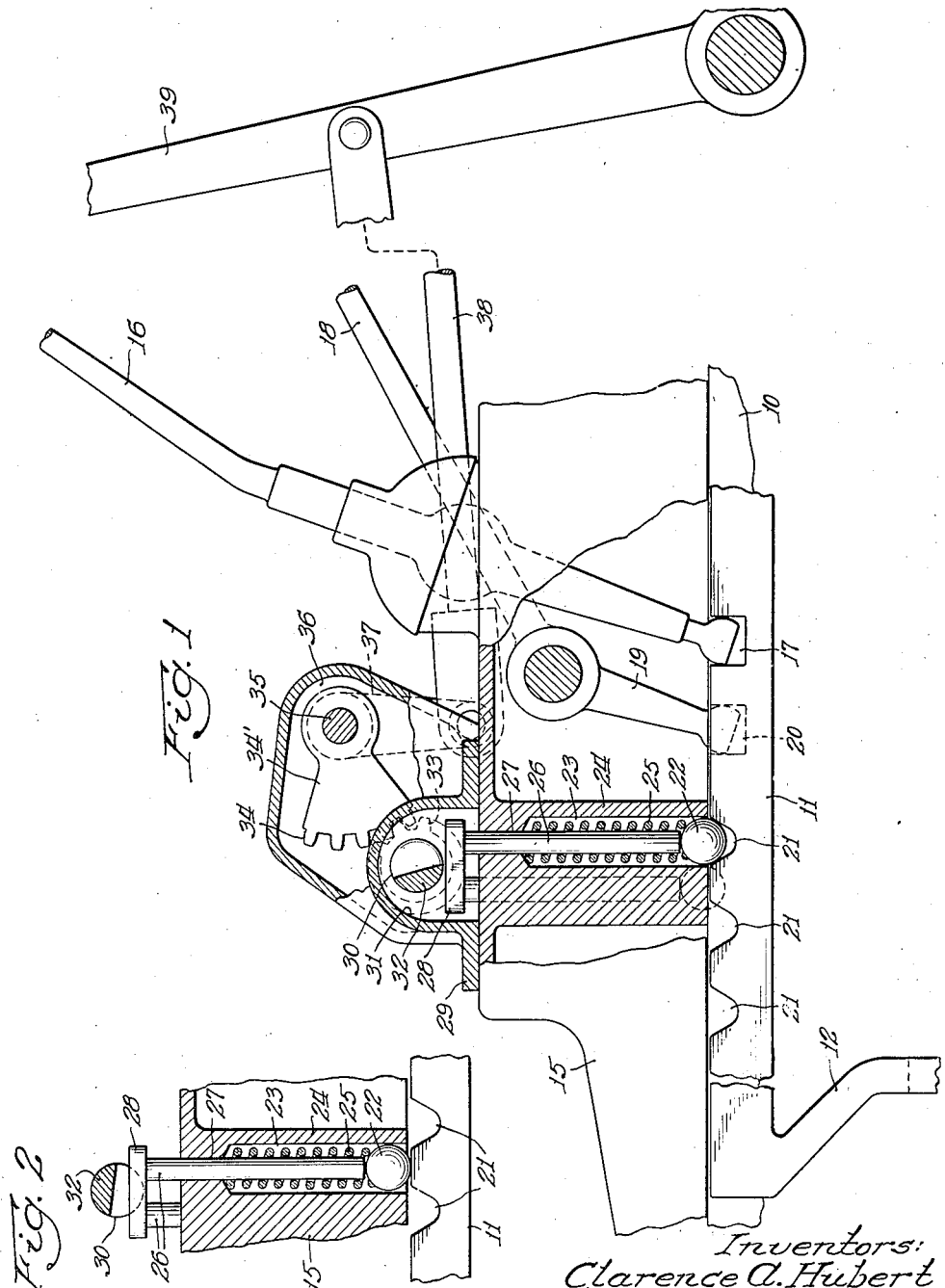
Inventors:
Clarence A. Hubert
and Harry A. Land.
By: Paul O. Pippel
Atty.

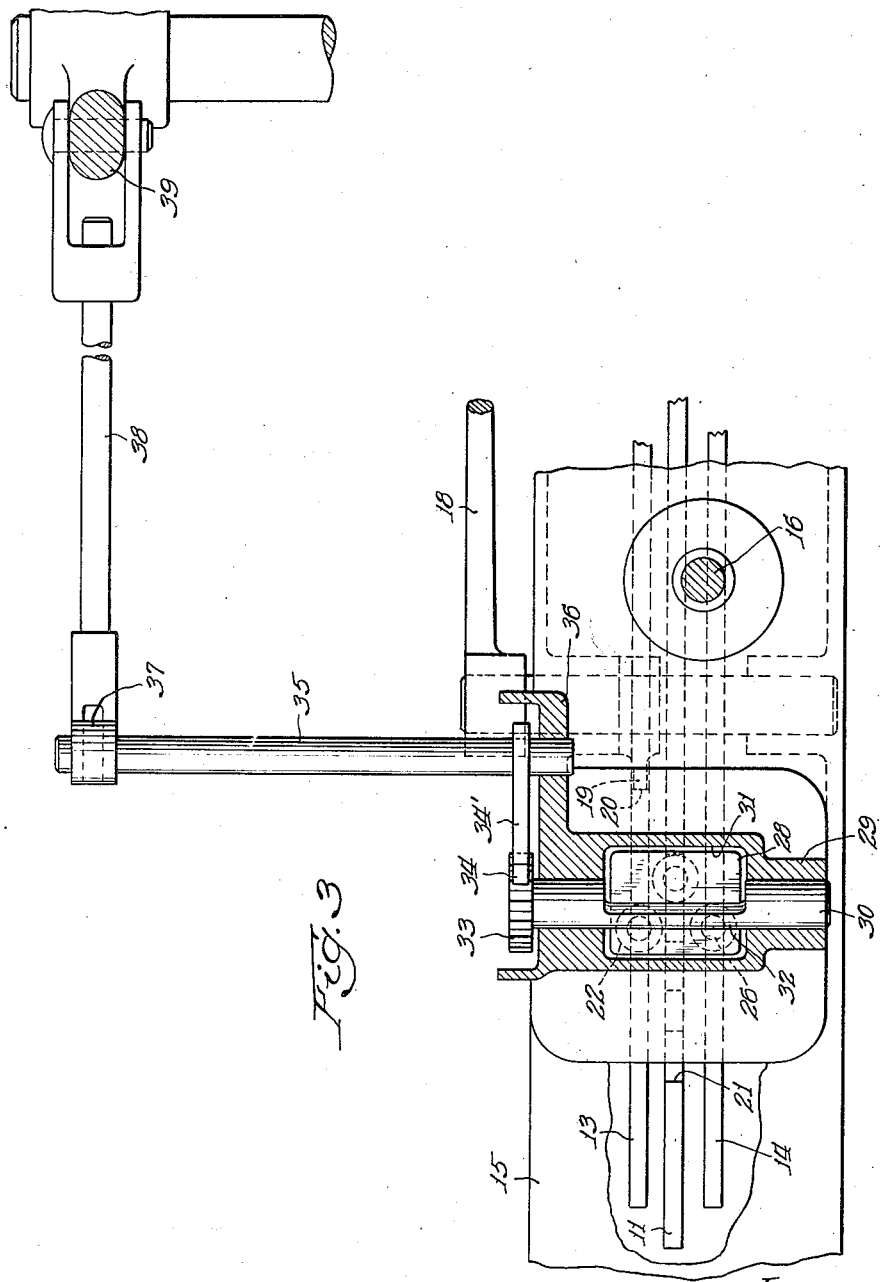

Patented Jan. 30, 1945

2,368,139

UNITED STATES PATENT OFFICE 2,368,139

GEAR SHIFTER LOCK

Clarence A. Hubert and Harry A. Land, Chicago, Ill., assignors to International Harvester Company, a corporation of New Jersey Application December 18, 1943, Serial No. 514,734

3 Claims. (Cl. 74—483)

This invention relates to change-speed transmissions. More specifically, it relates to shifter rail lock for transmissions of the slidable gear type.

In the conventional change-speed transmissions, shifter rails are ordinarily utilized for selecting the different speed changes of the transmission. These rails are usually parallel and lie close together whereby any one of a plurality may be engaged by lateral movement of a gear shift lever. Considerable difficulty has been encountered in providing suitable detent means for holding the shifter rails in position against non-intentional movement. Locking devices of various types have been provided, some of which have been actuated by the clutch throw-out lever so as to positively lock the rails in position against movement except when the clutch lever is operated.

The object of the present invention is to provide an improved positive locking means for the shifter rails of a change-speed transmission.

A more specific object is to provide an improved and simplified lock operated by the clutch throw-out lever and constructed to automatically take care of change in clutch-lever position due to clutch wear.

In the drawings,

Figure 1 is a side elevation, partly in section, showing the locking device as applied to a conventional transmission;

Figure 2 is a side elevation of the sectional part of Figure 1 showing the locking device during shifting of one of the shifter rails; and Figure 3 is an elevation, partly in section, showing the locking device of Figure 1 and the linkage connecting said device with the throw-out lever.

In the drawings only such structure has been shown as is necessary to illustrate the locking device of the invention. The upper portion 10 of a transmission case is indicated in Figure 1 with the shifter rail 11 being shown. A depending arm 12 is connected with the conventional throw-out collar for selectively engaging different speeds of the transmission. Figure 3 shows additional shifter rails 13 and 14.

To embody the present invention in a conventional transmission, a new housing 15 over the top of the transmission is substituted for the conventional housing, which contains the detent mechanisms for the shifter rails and provides a pivoted support for the shifting levers. A gear shift lever 16 is shown engageable with a notch 17 in the rail 11. It is understood that this lever may also be shifted laterally to engage a similar notch in the shifter rail 14. A second shifter lever 18 is illustrated which is provided with an extension arm 19 in the housing 15 which is located in a notch 20 of the shifter rail 13. This shift lever in the construction illustrated is for selecting different ranges of the transmission. It is to be understood that the invention is applicable whether one or two shifter levers is utilized and with the use of one or more shifter rails.

The shifter rail 11 is provided with three notches 21 adapted to be engaged by a ball 22. Said ball is adapted to slide vertically in a bore 23 formed in a portion 24 of the housing 15. A compression spring 25, seated against the ball 22 and against the terminating upper end of the bore 23, is adapted to maintain the ball in the notch 22. The pressure of the spring 25 is such, and the shape of the notch 21 is such, that the shifter rail 11 may be moved by the application of suitable pressure on the shifter lever 16. It has been found, however, that when the locking action of a detent mechanism of this type is mild enough to permit easy shifting it is not strong enough to hold the shifter rail against non-intentional displacement due primarily to certain running-out action of gears and gear-tooth clutches.

To provide a positive lock, a plunger 26 slidably mounted within the spring 25 extends through a bore 27 which is an extension of the bore 23, being smaller in diameter. Said plunger is connected by a suitable means to a plate 28 which is located in a cover 29 fitted on the housing 15.

As best shown in Figure 3, an actuating shaft 30 is journaled in the cover 29 at its ends extending through an enlarged chamber 31 between the ends, wherein it is formed into a cam lock structure. The shaft 30 has slightly more than half of its center cylindrical portion cut away to form the locking portion 32 which may be termed a cam lock although in a true sense it is merely a rotatable lock and not a cam as the portion which engages the plate 28 is cylindrical having the same axis as the shaft 30.

As shown in Figure 3, three of the plungers 26 appear in dotted lines as well as three of the balls 22. Each of these plungers with the associated ball and spring mechanism acts on one of the shifter rails, all of them being locked at once in the same manner as the rail 11, the locking of which will be described in detail. The shaft 30 projects at one end, being provided outside the cover 29 with a gear 33 the teeth of which are engageable with teeth 34 on the segment 34' of a gear which is mounted on a transverse shaft 35. Said shaft is journaled at one end in an extension 36 of the cover 29. At its other end said shaft is provided with a lever arm 37 which is in turn connected by a link 38 with the clutch-operating lever 39.

In the operation of the locking device as above described, the plungers 26 extend in close proximity with the balls 22, sufficient clearance being provided to eliminate any binding action on the locking shaft with the plate 28. As illustrated in Figure 1, the plate 28 is positively held against upward movement by engagement with the adjacent portion 32 of the shaft 30. As the force against said shaft is through the center, there is no possibility of the thrust against the ball 22 acting to turn the shaft to disengage the locking means. The operating linkage for said shaft may therefore be free and unencumbered with springs or other biasing means. When it is desired to shift any one of the rails 11, 13, and 14, it is, of course, necessary to first disengage the clutch. When the lever 39 is moved to the right, as shown in Figure 1, the shaft 30 is rotated clockwise bringing the portion 32 into the position shown in dotted lines in Figure 1 and in solid lines in Figure 2. Actuation of either of the shifting levers 16 or 18 lifts the corresponding balls 22 against its plunger 26 lifting all of the plungers and the plate 28, to which they are connected, to the position shown in Figure 2. This permits free shifting of the rail with no more force than is required to overcome the spring 23. In a construction of this type, with the advantages of a positive lock the springs, which together with the balls serve as locking detents, may be made relatively lighter than is conventional practice. Very little force is required to lift the plungers as there is no connection of the plungers and the plate 28 with the locking linkage when the clutch is disengaged.

A particular advantage of the construction of this invention is the inherent provision for clutch wear. As the clutch wears, the lever 39 moves to the left, as shown in Figure 1, a greater degree. This in turn rotates the shaft 30 anti-clockwise to a greater degree. Inspection of Figure 1 will show that the engaged position of the clutch lever 39 could move to the left sufficiently to bring the shaft 30 almost 180 degrees farther than illustrated in the clockwise direction without disturbing the locking function. During such change of position of the lever 39 there would be no binding action on the locking mechanism and the disengaged position of the clutch lever, which is substantially the same regardless of where, would not affect the unlocking of the device. To provide for substantial variation in the disengaged position of the clutch lever, provision is made, as is evident by inspection of Figure 2, for substantial variation in the position of the shaft 30 without interfering with necessary movement of the balls 22 and the plunger 26.

It is to be noted that applicants have shown only a preferred embodiment of their improved and simplified shifter-rail locking mechanism and that they claim as their invention all modifications falling within the scope of the appended claims.

What is claimed is:

1. In a power transmission assembly having a clutch-actuating lever and transmission shifter rails, a locking device comprising in combination with the shifter rails and the clutch-actuating lever, a housing mounted over the shifter rails, said housing being formed with bores over said rails, compression springs mounted in said bores, said shifter rails being provided with notches, balls adapted to be seated in said notches and resiliently held therein by said springs, plungers extending through the springs to a position adjacent said balls, said plungers being reciprocable with movement of said balls into and out of said notches, a transverse shaft above said plunger, a cam carried by said shaft, said cam being substantially semi-cylindrical in cross section with the center of its circular portion concentric with the center of the shaft, a plate secured to the upper end of said plungers, said cam being located to pass adjacent said plate when the balls are seated in the notches upon rotation of the shaft in one direction and to move away from said plate permitting upward movement of the plungers when the shaft is moved in the other direction, an actuating linkage connecting said shaft with the clutch throw-out shaft operable when the clutch is engaged to move the cam to lock the plungers and to thereby lock the shifter rails and operable upon release of the clutch to move the cam away from the locking position whereby said plunger structure may lift with any of the balls and permit actuation of the shifter rails.

2. In a power transmission assembly including a clutch operating member and a plurality of adjustable transmission shifter rails notched to receive detent members for resisting adjustment of said rails when the detent members are yieldably urged into such notches and for locking said rails against adjustment when the detent members are positively held in such notches; the combination of a casing containing guide-ways for said detent members to guide them into and from the shifter rail notches, springs constantly urging the detent members against their respective rails and hence into any of the associated rail notches in registry therewith, a locking structure unitarily movable into a locking position for disposing portions thereof in the respective paths of movement of said detent members to positively hold them in their rail notches, and means operable under control of said clutch actuating member to move said locking structure into said locking position incident to movement of the clutch operating member for engaging its clutch.

3. In a power transmission assembly including a clutch operating member and a plurality of adjustable transmission shifter rails notched to receive detent members for resisting adjustment of said rails when the detent members are yieldably urged into such notches and for locking said rails against adjustment when the detent members are positively held in such notches; the combination of a casing containing guide-ways for said detent members to guide them into and from the shifter rail notches, springs constantly urging the detent members against their respective rails and hence into any of the associated rail notches in registry therewith, a locking structure having detent engaging portions normally respectively in the paths of movement of said detent members and unitarily movable by force applied to any of such portions by its associated detent member when the latter is displaced from a notch in its associated rail pursuant to adjustment of such rail, and means operable under control of said clutch operating member for blocking such movement of the locking structure and to thereby positively hold the detent members in associated rail notches when the clutch is engaged and to release said locking structure for its said movement when the clutch is disengaged.

CLARENCE A. HUBERT.
HARRY A. LAND.